US012613744B2

(12) United States Patent
Saha et al.

(10) Patent No.: US 12,613,744 B2
(45) Date of Patent: Apr. 28, 2026

(54) OPTIMIZING RAN COMPUTE RESOURCES IN A VERTICALLY SCALED vRAN DEPLOYMENT

(71) Applicant: TEJAS NETWORKS LIMITED, Bengaluru (IN)

(72) Inventors: Anindya Saha, Bengaluru (IN); Parag Balwant Naik, Bengaluru (IN); Sandeep Pendharkar, Bangalore (IN); Venugopal Kolathur, Belgaum (IN); Vasanth Shreesha, Bangalore (IN)

(73) Assignee: TEJAS NETWORKS LIMITED, Bengaluru (IN)

( * ) Notice: Subject to any disclaimer, the term of this patent is extended or adjusted under 35 U.S.C. 154(b) by 1078 days.

(21) Appl. No.: 17/694,026

(22) Filed: Mar. 14, 2022

(65) Prior Publication Data

US 2022/0291961 A1 Sep. 15, 2022

(30) Foreign Application Priority Data

Mar. 12, 2021 (IN) .............................. 202141010490

(51) Int. Cl.
*G06F 9/50* (2006.01)

(52) U.S. Cl.
CPC ........ *G06F 9/50* (2013.01); *G06F 2209/5011* (2013.01)

(58) Field of Classification Search
None
See application file for complete search history.

(56) References Cited

U.S. PATENT DOCUMENTS

| | | | | |
|---|---|---|---|---|
| 9,300,548 | B2 * | 3/2016 | Asthana | .................... G06F 9/50 |
| 11,093,358 | B2 * | 8/2021 | Venugopal | .......... G06F 11/2242 |
| 11,219,032 | B2 * | 1/2022 | Kim | ...................... H04W 24/02 |
| 11,758,455 | B2 * | 9/2023 | Anderson | ............. H04W 36/10 |
| | | | | 370/331 |
| 11,812,518 | B2 * | 11/2023 | Foukas | ................. H04W 88/12 |

(Continued)

OTHER PUBLICATIONS

Hassan Halabian, Huawei Canada Research Center, 978-3-903176-15-7 c 2019 IFIP; (Halabian_2019.pdf; pp. 28-35) (Year: 2019).*

(Continued)

*Primary Examiner* — Hiren P Patel
(74) *Attorney, Agent, or Firm* — HSML P.C.

(57) ABSTRACT

Configurations of a system and a method for optimizing an allocation of computing resources via a disaggregated architecture, are described. In one aspect, the disaggregated architecture may include a Layer 2 (L2) controller that may be configured to optimize an allocation of computing resources in a virtualized radio access network (vRAN). The disaggregated architecture in a distributed unit may disaggregate an execution of the operations of the distributed unit by the computing resources deployed therein. Further, the disaggregated architecture may provision statistical multiplexing and provision a mechanism for allocating the computing resources based on real-time conditions in the network. The disaggregated architecture may provision a mechanism that may enable dynamic swapping, allocation, scaling up, management, and maintenance of the computing resources deployed in the distributed unit (DU).

11 Claims, 10 Drawing Sheets

(56)     References Cited

U.S. PATENT DOCUMENTS

| | | | | |
|---|---|---|---|---|
| 12,260,251 | B2 * | 3/2025 | Foukas | G06F 9/505 |
| 12,277,452 | B2 * | 4/2025 | Garcia-Saavedra | G06N 3/045 |
| 2008/0028409 | A1 * | 1/2008 | Cherkasova | G06F 9/5061 |
| | | | | 718/104 |
| 2014/0181834 | A1 * | 6/2014 | Lim | G06F 9/5088 |
| | | | | 718/105 |
| 2015/0341839 | A1 * | 11/2015 | Kim | H04W 16/08 |
| | | | | 370/331 |
| 2017/0325128 | A1 * | 11/2017 | Bhattacharjee | H04W 28/16 |
| 2019/0387471 | A1 * | 12/2019 | Salmela | H04W 52/0229 |
| 2020/0382975 | A1 * | 12/2020 | Jo | H04W 28/16 |
| 2020/0383115 | A1 * | 12/2020 | Kim | H04W 72/54 |
| 2021/0109830 | A1 * | 4/2021 | Venugopal | H04L 67/10 |
| 2021/0266792 | A1 * | 8/2021 | Park | G06F 9/45558 |
| 2021/0329475 | A1 * | 10/2021 | Bedekar | H04W 88/08 |
| 2022/0075655 | A1 * | 3/2022 | Thyagaturu | G06F 9/5044 |
| 2022/0385577 | A1 * | 12/2022 | Kim | H04L 47/12 |
| 2023/0044648 | A1 * | 2/2023 | Centonza | H04W 36/22 |

OTHER PUBLICATIONS

Ismail et al.; "Optimum Functional Splits for Optimizing Energy Consumption in V-RAN"; IEEE, Digital Object Identifier 10.1109/ACCESS.2020.3033879; (ismail_2020.pdf; pp. 194333-194341) (Year: 2020).*

* cited by examiner

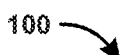
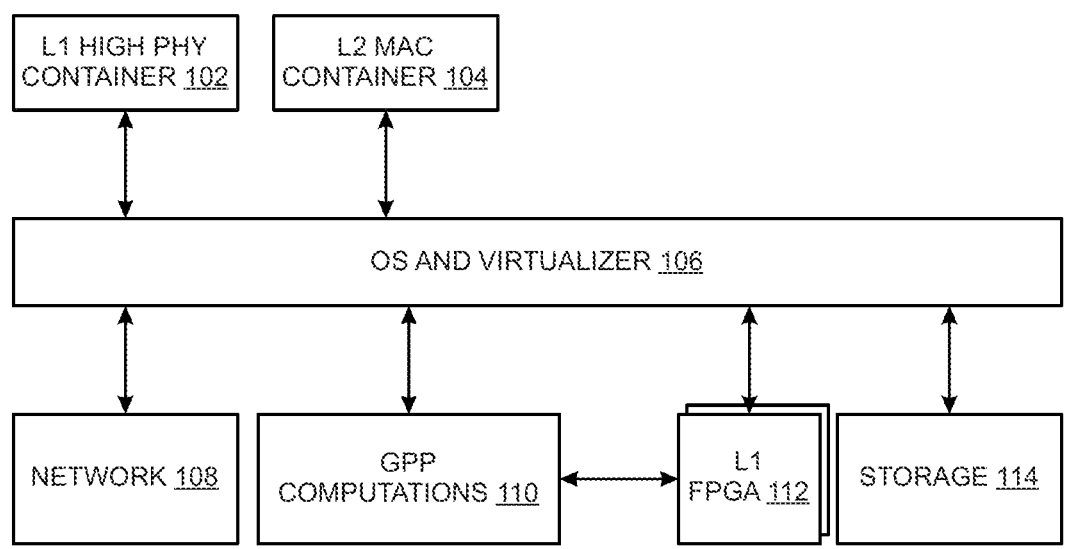
PRIOR ART
FIG. 1

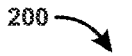
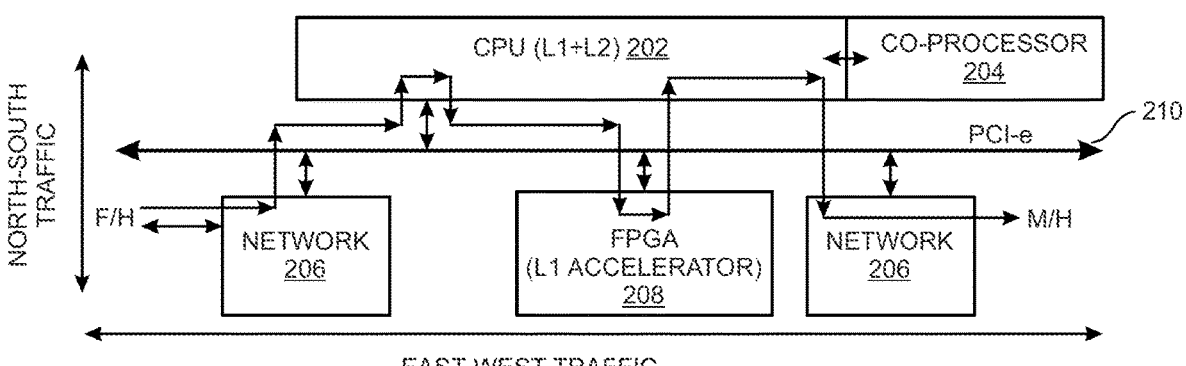
PRIOR ART
FIG. 2

300

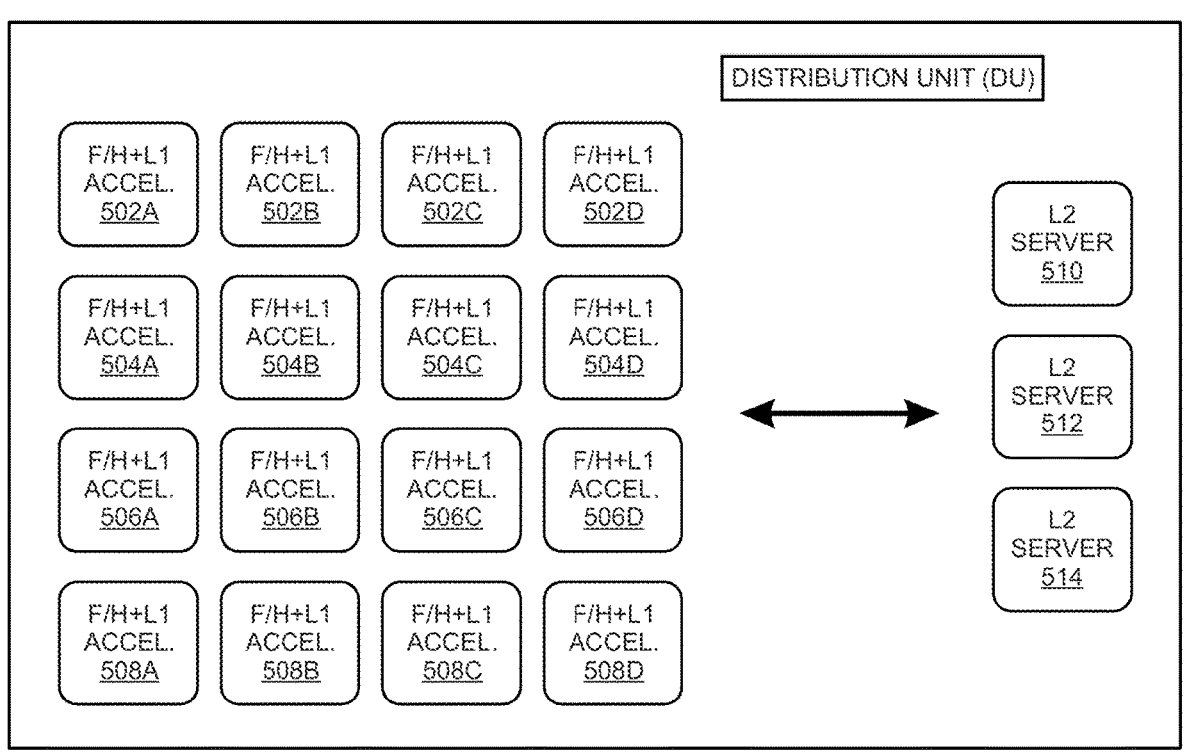
FIG. 5

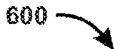
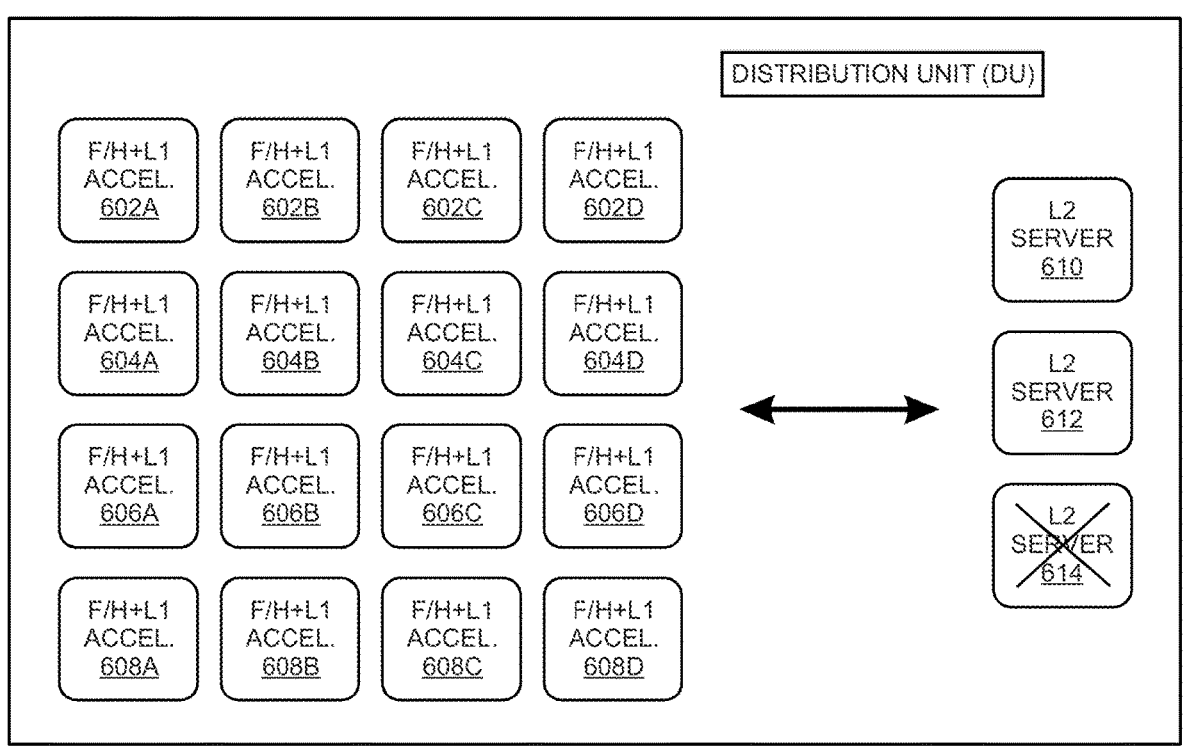
FIG. 6

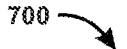
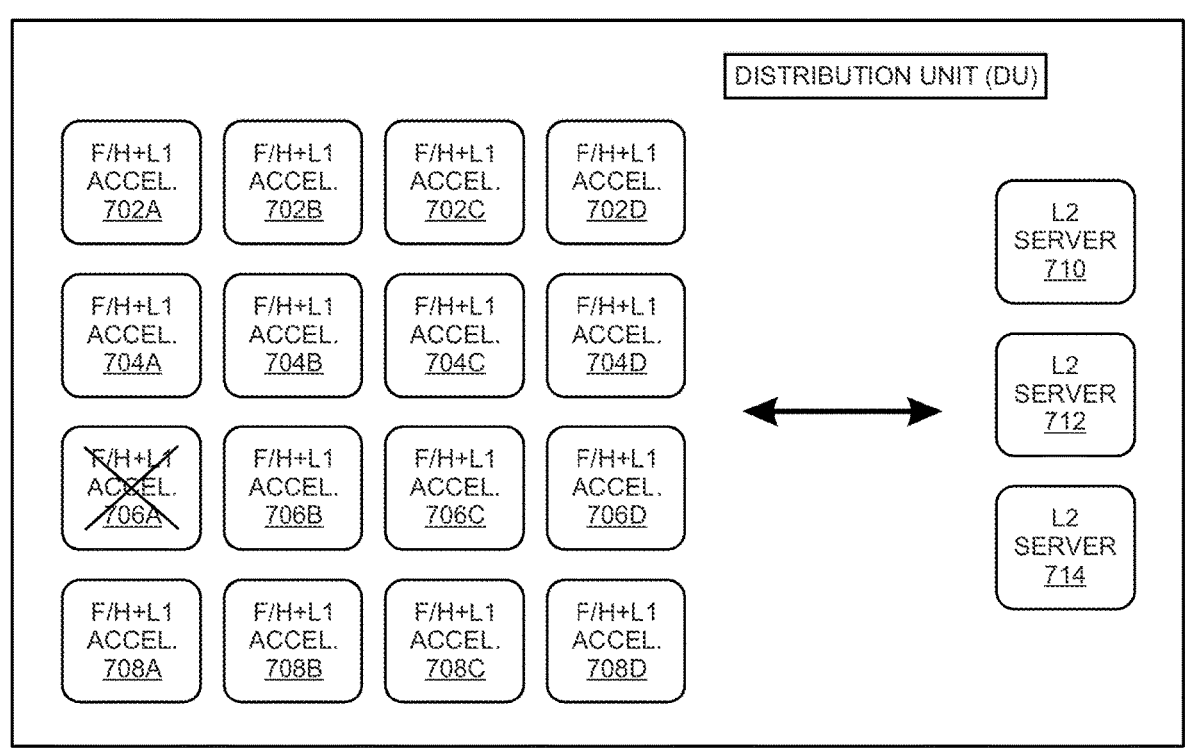
FIG. 7

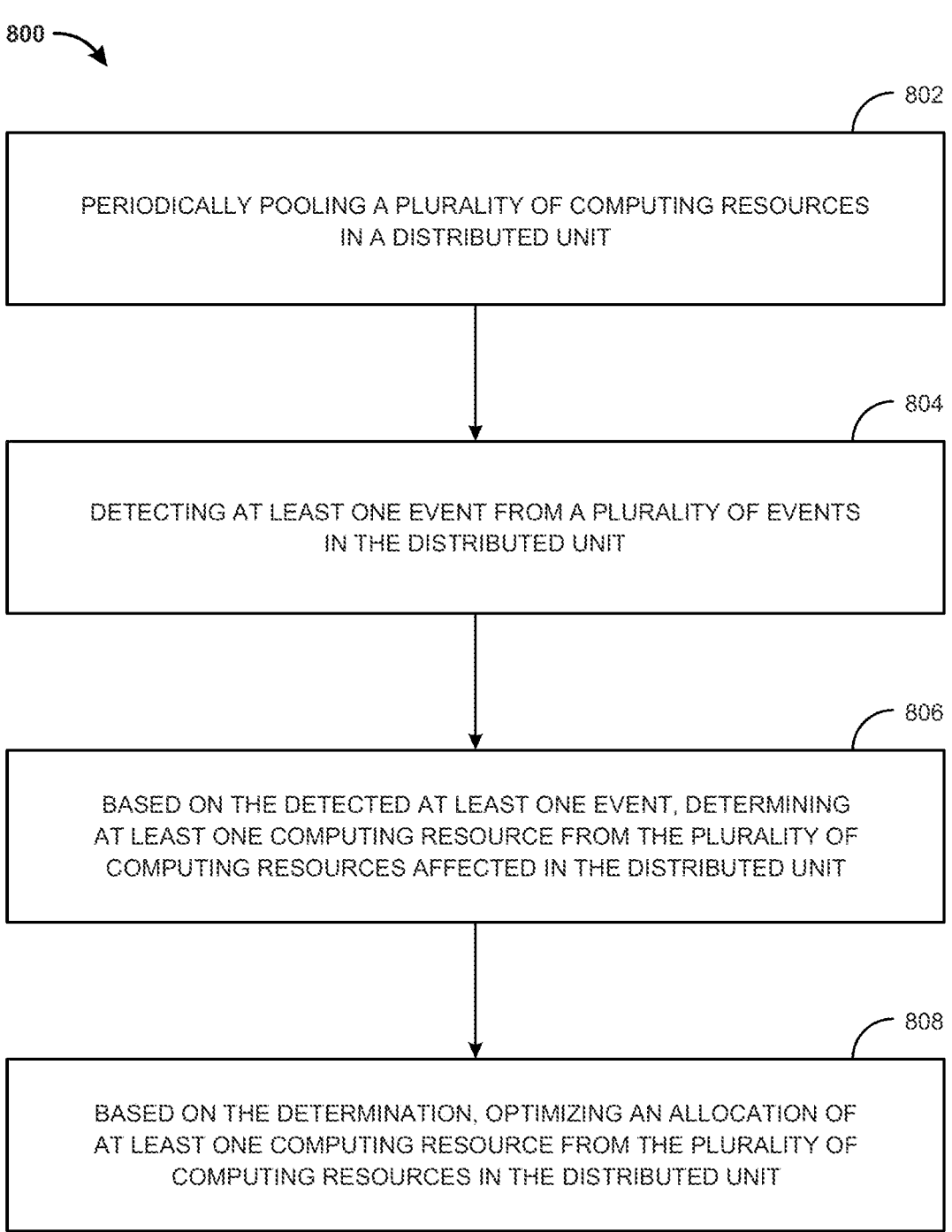

800

802

PERIODICALLY POOLING A PLURALITY OF COMPUTING RESOURCES
IN A DISTRIBUTED UNIT

804

DETECTING AT LEAST ONE EVENT FROM A PLURALITY OF EVENTS
IN THE DISTRIBUTED UNIT

806

BASED ON THE DETECTED AT LEAST ONE EVENT, DETERMINING
AT LEAST ONE COMPUTING RESOURCE FROM THE PLURALITY OF
COMPUTING RESOURCES AFFECTED IN THE DISTRIBUTED UNIT

808

BASED ON THE DETERMINATION, OPTIMIZING AN ALLOCATION OF
AT LEAST ONE COMPUTING RESOURCE FROM THE PLURALITY OF
COMPUTING RESOURCES IN THE DISTRIBUTED UNIT

FIG. 8

OPTIMIZING RAN COMPUTE RESOURCES IN A VERTICALLY SCALED vRAN DEPLOYMENT

CROSS REFERENCE TO RELATED APPLICATIONS/INCORPORATION BY REFERENCE

This application claims the priority benefit of Indian Provisional Patent Application No. 202141010490, filed on Mar. 12, 2021. The entirety of the above-mentioned patent application is hereby incorporated by reference and made a part of this specification.

FIELD

The configurations of a system and a method for optimizing the allocation of computing resources via a disaggregated architecture, are described.

BACKGROUND

Limitations and disadvantages of conventional and traditional approaches will become apparent to one of skill in the art, through comparison of described systems with some aspects of the present disclosure, as set forth in the remainder of the present application and with reference to the drawings.

SUMMARY

Configurations of a system, and a method to optimize allocation of computing resources in a distributed unit in a virtualized radio access network (vRAN), are described. The system and method include periodically pooling the computing resources in the distributed unit. Upon detecting an event, computing resources affected in the distributed unit due to occurrence of the event may be determined. Based on the determination, allocation of the computing resource may be optimized in the distributed unit. The optimization may include dynamically detecting and reconfiguring one of the multiple computing resources so as to reallocate to another computing resource of the multiple computing resources an operation which previously was executed by one of the multiple computing resources. The system and method described herein further provision disaggregation of operations of Layer 1 (L1) from Layer 2 (L2) without impacting a latency. The system and method described herein further provision transferring L1 processed data to an L2 processor via an ethernet port using standard FAPI interface protocols. The systems and method described herein further provision visibility to L1 accelerators or computing resources to other computing resources in the distributed network.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

FIG. 1 is a block diagram showing a conventional architecture of a distributed unit (DU) in a vRAN deployment, according to an exemplary implementation.

FIG. 2 is a data flow diagram in a conventional architecture of a distributed unit (DU) in a vRAN deployment, according to an exemplary implementation.

FIG. 5 is a block diagram showing a deployment of an array of computing resources in the disaggregated architecture of the distributed unit (DU), according to an implementation.

FIG. 6 is a block diagram showing an implementation of automatic reconfiguration of the computing resources by the L2 controller, when a failure of a server is detected, according to an exemplary implementation.

FIG. 7 is a block diagram showing an implementation of an automatic allocation of a computing resource by the L2 controller, when a failure of another computing resource is detected, according to an exemplary implementation.

FIG. 8 is a flow diagram showing a process for optimizing an allocation of a computing resource, according to an exemplary implementation.

DETAILED DESCRIPTION

Figure 3A:
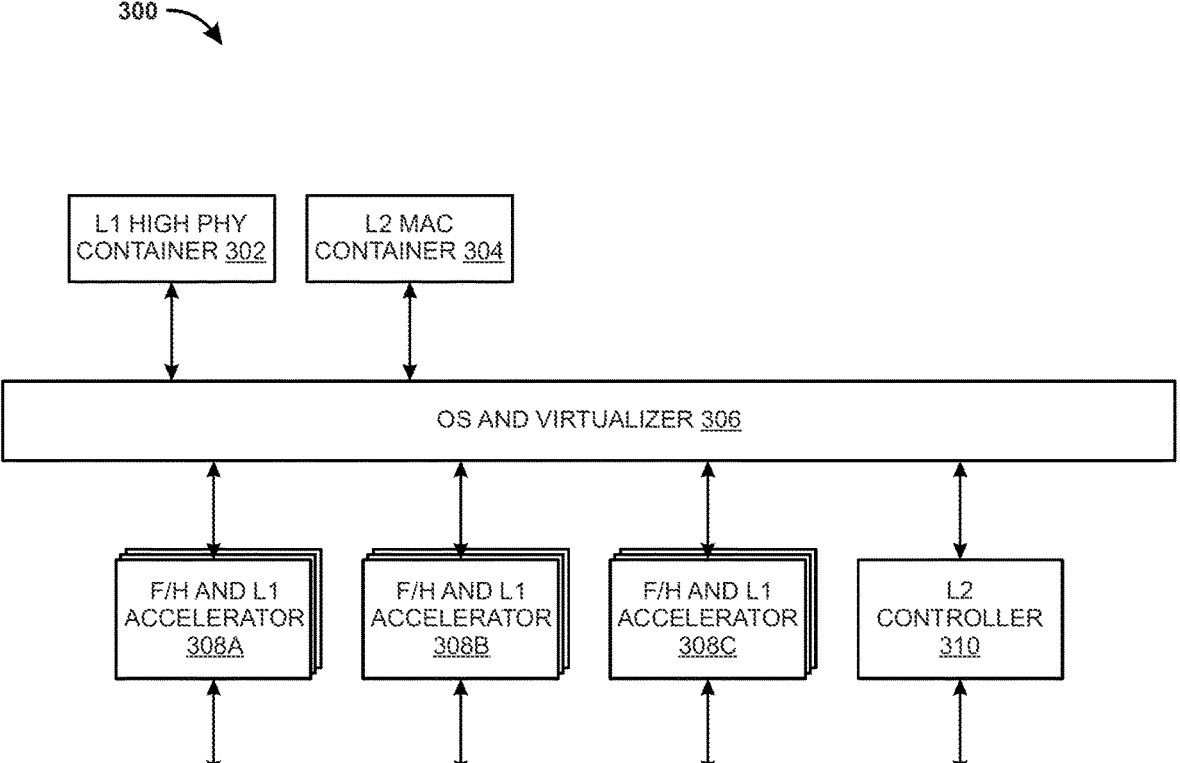
FIG. 3A is a block diagram showing a disaggregated architecture of a distributed unit (DU) in the vRAN deployment, according to an exemplary implementation.

Implementations of techniques for optimizing RAN compute resources in a vertically scaled vRAN deployment are herein described.

In an implementation, the terms software components or components, software routines or routines, software models or models, software engines or engines, software scripts or scripts, layers, are used interchangeably throughout the subject specification, unless context warrants particular distinction(s) amongst the terms based on implementation. The implementation primarily involves executing computer readable code such as, a sequence of instructions, by a processor of a computing device (e.g., a special purpose computer, a general-purpose computer, mobile device) in an integrated environment. The computing device may be configured to execute operations of the special purpose computer when the instructions stored in the memory of the computing device are executed by the processor. The execution of specific operations enables the computing device to execute operations as the special purpose computer, thereby improving the technical operation of the special purpose computer. The execution of specific operations, either individually or in cooperation, may collectively provision a platform, a framework, or an architecture that optimizes the allocation of computing resources in a distributed unit. The above models, software components, software routines, may be reused based on definition and implementation.

Advancement in mobile communication technologies has progressively led to evolution of virtualized RAN (vRAN). vRAN deployments may enable implementing hardware functionalities via software routines or software modules, thereby virtualizing the operations executed by the RAN. Further, vRAN deployments may virtualize network functions and provide a flexible architecture for implementing the operations of the RAN on software platforms using general purpose processors (GPPs). The vRAN based deployments may provide platforms for centralizing 5$^{th}$ generation (5G) mobile infrastructure implementation.

The vRAN deployments based on technical standards and specifications, for example, an open RAN (O-RAN), may distinctly segregate the operations of a distributed unit (DU). In an implementation, a lower layer of the DU may execute operations of a physical (PHY) layer, a medium access control (MAC) layer, a radio link control (RLC) and a packet data convergence protocol (PDCP). Typically, the operations of the PHY layer and the MAC layer may include modulation, demodulation, scrambling, descrambling, channel estimation, pre-coding, equalization, packet processing, and scheduling. The distinct segregation of the operations of the distributed unit may include a lower physical (low PHY) layer operation and a higher physical (high PHY) layer operation. The operations of the high PHY may be executed at a Layer 1 (L1) high PHY container and operations of the MAC may be executed at a Layer 2 (L2) MAC container. A container may correspond to a mechanism to isolate an execution of two or more software functions or operations using same hardware or computing resources. The operations and dependent functions or processing of the L1 high PHY may be executed in the L1 high PHY container. Similarly, the operations and dependent functions or processing of the L2 MAC may be executed in the L2 MAC container.

FIG. 1 is a block diagram showing a conventional architecture 100 of a distributed unit (DU) in a vRAN deployment, according to an exemplary implementation. The conventional architecture 100 may provision execution of the operations of the PHY layer, the MAC layer, the RLC and the PDCP by statically binding the computing resources to execute the operations in the distributed unit. In an implementation, vRAN deployments may be based on technical standards and specifications, for example, O-RAN, may split the traditional signal processing chain or functions of the distributed unit into lower physical layer (also referred to as low PHY) functions and higher physical layer (also referred to as high PHY) functions. In an embodiment, the functions high PHY may be executed at L1 high PHY container 102 and functions of MAC may be executed at L2 MAC container 104. The aforementioned containers (e.g., 102 and 104) may execute the operations by cooperatively working with the computing resources (e.g., 108, 110, 112, 114) via operating system (OS) and virtualized layer 106. For example, the computing resources may execute operations related to the network 108 layer, compute (shown as GPP computations 110) and storage 114. The computing resources may include, for example, general purpose processors (GPPs), field programmable gate arrays (FPGAs), graphical processing units (GPUs), single core or multicore central processing units (CPUs), network accelerator cards, etc. For example, the computing resources shown in FIG. 1 may execute operations of, for example, a network layer 108 and certain functions of L1 and L2; a general purpose processor (GPP) computations 110 may execute certain operations including general baseband processing, control, and a management of L1 and L2 operations; and a Layer 1 (L1) field programmable gateway array (FPGA) 112 may execute or accelerate execution of some of the operations of L1. The above-described arrangement may statically bind the computing resources with one to one mapping for executing specific operations. Further, the execution of some of the operations may be implemented using proprietary or custom hardware, such as a commercial off the shelf (COTS) server, and processors including graphics processing unit (GPU). Such static binding and use of the proprietary hardware for executing specific or the subset of operations may result in redundancies including an underutilization of the computing resources and an increase in cost of the infrastructure, thereby restricting on demand scaling of the computing resources due to limited space availability and physical constraints for deploying additional hardware.

FIG. 2 is a data flow diagram 200 in a conventional architecture 100 of a distributed unit (DU) in a vRAN deployment, according to an exemplary implementation. The data flow diagram 200 shows north-south traffic and east-west traffic. North-south traffic corresponds to the data transfer from the data center and a location outside the network. North-south traffic is typically depicted vertically to illustrate data transfer or traffic that flows in and out of the data center. East-west traffic corresponds to the data transfer or traffic from one server to another server within the data center. The term east-west is typically depicted horizontally to illustrate data transfer or traffic that flows between the data centers and may be related to a local area network (LAN) traffic.

With reference to FIG. 2, there is shown a data flow diagram 200 from a mobile front-haul (F/H) to a mid-haul (M/H) implemented via the conventional architecture 100. Referring to FIG. 2, there is shown that data is processed by different computing resources of the distributed unit (DU) along the signal chain. For example, the data may be intermittently processed by the different computing resources (e.g., 202, 204, 206, and 208) leading to underutilization of some of the computing resources. For example, the data may first be processed by computing resources in, for example, the network layer (e.g., 206). Subsequently, the data may be processed via an execution of the operations of the L1 and L2 by CPU (L1 and L2) 202 and a co-processor 204. In an implementation, when the volume of data increases, the computing capacity of 202 and 204 may be exceeded and the computing resource CPU (L1 and L2) 202 may offload certain data processing and operations related to Layer 1 to the L1 to FPGA (L1 accelerator) 208 (e.g., L1 FPGA 112 of FIG. 1). The FPGA (L1 accelerator) 208 may process and execute the operations related to Layer 1 and transfer the processed data back to 202 and 204, and 206, where data may be processed via an execution of subsequent operations and this processed data is transmitted to M/H.

Referring to FIG. 2, it may be observed that the computing resources namely 202 and 204 may be idle or be not utilized, when the data is processed by the FPGA (L1 accelerator) 208. Further transferring the processed data (e.g., shown as north-south traffic and east-west traffic in FIG. 2) between the computing resources (e.g., between 206 and 202) may be via a peripheral component interconnect express PCI-e interface 210. The PCI-e interface 210 may have constraints, such as limited slots for connecting other computing resources or peripheral devices, and limited bandwidth for data transfer, thereby further limiting the scaling of computing resources on demand. Further, for adding or replacing the computing resources, the conventional architecture 100 may be necessitated to be powered down, resulting in an operational overhead due to network downtime. Further the computing resources deployed in the conventional architecture 100 may lack visibility and seamless access to the other computing resources deployed in the distributed unit.

FIG. 3A is a block diagram showing a disaggregated architecture 300 of a distributed unit (DU) in the vRAN deployment, according to an exemplary implementation. In an implementation, for example, two containers (e.g., L1

High PHY Container 302 and L2 MAC Container 304) may cooperatively work with the computing resources (e.g., 308A, 308B, 308C) via an operating system (OS) and virtualized layer 306 to execute operations in the distributed unit. The disaggregated architecture 300 may provide disaggregating the execution of operations of the lower layer of the distributed unit. For example, the execution of the operations by the computing resources corresponding to the PHY layer, the MAC layer, the radio link control (RLC) and the packet data convergence protocol (PDCP) may be disaggregated, thereby provisioning a mechanism to optimize an allocation of the computing resources. Such optimized allocation may enable complete or full utilization of the allocated computing resources. For example, the optimal allocation of the computing resources may include the allocation of one or a subset of the computing resources from an array of computing resources, to continue an uninterrupted execution of the operations in the distributed unit.

In an implementation, an L2 controller 310 may be configured to work in cooperation with the computing resources (e.g., 308A, 308B, 308C). The L2 controller 310 may be configured to detect an event in the network that is noteworthy. For example, the event may correspond to a failure of a network device or the computing resource or when a certain characteristic of the network may cross a threshold value. For example, an on demand or real time increase in a volume of the data consumed may result in the certain characteristic crossing the threshold value. Similarly, when the volume of the data consumed reduces, this may result in the certain characteristic crossing the threshold value. Such an event may be noted in a log file, or on a display, or by issuing an alarm, depending on the priority level of the event.

Referring to FIG. 3A, the L2 controller 310 may be configured to execute a routine or a mechanism to pool the computing resources periodically or dynamically in real-time in the distributed unit. Such periodic pooling may enable detecting the occurrence of the event and execute a subsequent action in response to the detected event. For example, the event may correspond to the increase in the volume of data in the network that may require scaling the allocated computing resources for processing for seamless execution of the operations in the distributed unit. Another event may correspond to a detection of, for example, a failure of any of the computing resources, servers, and hardware elements, deployed in the distributed unit (DU). In such circumstances, the L2 controller 310 may be configured to dynamically detect, allocate and reconfigure the computing resources to seamlessly continue execution of the operations, thereby mitigating instances of network downtime. Such dynamic allocation of the computing resources may enable efficient utilization of the computing resources thereby providing flexibility to implement the execution of the operations related to L1 or L2 using general purpose processors and eliminating the need of using the custom or proprietary computing resources. Further the dynamic allocation of the computing resources eliminates the need to statically bind the computing resources for executing specific operations, thereby reducing the total cost for deploying and maintaining the infrastructure for mobile service providers.

In an implementation, the L2 controller 310 may be configured to pool the deployed computing resources, for example, the L1 network accelerator cards, and execute the operations such as allocating, configuring, deploying, and managing the allocated computing resources for executing the operations. Such a pooling mechanism to manage the operations of the RAN may enable provisioning the execution of the operations as a service (e.g., RAN as a Service (RaaS)). The execution of the further operations by the L2 controller 310 may enable scaling up the allocation of the computing resources on demand and provides flexibility for deployment of a large number of radio units (RU), thereby reducing the dependencies for data processing and eliminating the need of using statically bound computing resources. Further, the disaggregated architecture 300 may reduce the operational and infrastructure costs, optimizes the utility of the computing resources, thereby reducing the power consumed by the computing resources.

In an implementation, when the volume of data processed or the network traffic dynamically increases or decreases in real time, the execution of operations in the L2 controller 310 may be configured to dynamically allocate and efficiently utilize the computing resources in the distributed unit. For instance, the execution of the operations of L1 and L2 may be disaggregated, scheduled, and executed in real time, when there is an outburst or sudden increase in the volume of data or the network traffic. Further, disaggregated architecture 300 may provision improving the utility of the physical space for deploying the computing resources.

In an implementation, the deployment of the computing resources in the disaggregated architecture 300 may include the deployment of an array of computing resources. The array of computing resources may be statistically multiplexed for the execution of the specific operations. Such statistical multiplexing may enable optimization of the allocation and management of the number of computing resources required to execute the specific operations. From the statistically multiplexed array of the computing resources in the disaggregated architecture 300, one or more computing resources may be allocated for scaling up the data processing capabilities. Further, the statistical multiplexing may provision eliminating the need of powering down the network, when one or more computing resources fail and needs to be replaced or substituted. Such a mechanism of adding and/or substituting the computing resources without powering down the network may enable provisioning hot plugging. The mechanism of hot plugging may correspond to connecting or disconnecting computing resources without compromising network operations or having to reboot the network in order to use added or replaced computing resources. The disaggregated architecture 300 provisions dynamic allocation of the computing resources in real time that may further improve the network availability and increases the reliability of the communication service providers. The disaggregated architecture 300 may provision execution or processing higher volumes of data using the statistically multiplexed array of computing resources, thereby reducing the total cost of ownership for managing the execution of operations in the distributed unit.

Referring to FIG. 3A, the disaggregated architecture 300 may disaggregate the execution of operations of L1 and L2 that may be implemented on multiple computing resources, without impacting a latency. Further, the disaggregated architecture 300 may enable interchanging, or swapping, or allocating the computing resources based on real-time network traffic and on demand network conditions. The deployment flexibility further provisions communication and data transfer between the computing resources, for example, L1 and L2 via a standard ethernet ports using standard functional applicational programming interface (FAPI) protocols.

In an implementation, an arrangement in a data center may include the deployment of the computing resources in a number of racks having spaces. Such spaces may be referred to as single large expensive disk spaces (SLEDS), that may provision the computing resources (e.g., 308A, 308B, 308C). The disaggregated architecture 300 may provision a statically multiplexing operation or a connection of the computing resources that may be deployed in multiple SLEDS. The data processed or generated in response to the execution of the operations by the computing resources in one SLED space may be transferred to the computing resources in another SLED space via physical interfaces, such as ethernet ports. The disaggregated architecture 300 may therefore eliminate the need for using PCI-e interfaces for connecting the computing resources or transferring processed data between the computing resources.

In an implementation, when additional computing resources are deployed for executing the operations of L1 and/or L2, a RAN hypervisor 320 (see FIG. 3B), also referred to as a RAN visor, may cooperatively work with the disaggregated architecture 300. Such cooperative working may provision virtualization for managing the allocation of the computing resources. In an implementation, the RAN visor may correspond to a module that enables the virtual machines with a unified view of an underlying RAN hardware or the computing resources. Further, the RAN visor may be executed on any computing device to manage the virtual instances of the computing resources. For example, the RAN hardware resources may include a cluster of DSPs or FPGA's or other computing resources.

Figure 3B:
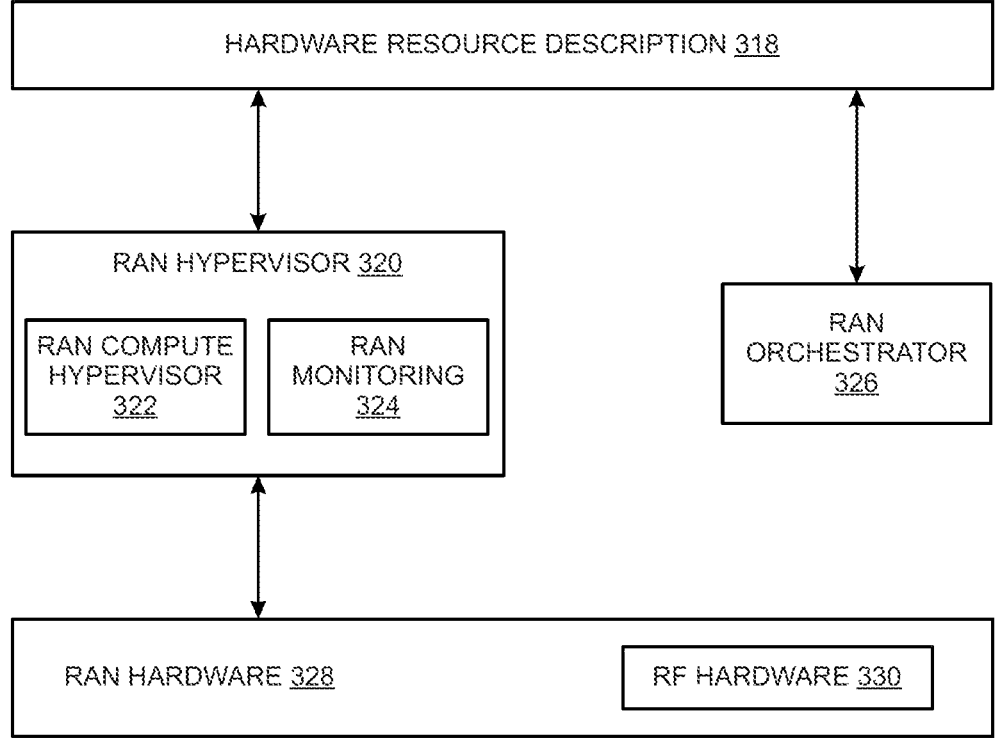
FIG. 3B is a block diagram showing a RAN hypervisor working in cooperation with the disaggregated architecture of the distributed unit (DU) in the vRAN deployment, according to an exemplary implementation.

FIG. 3B is a block diagram showing a RAN hypervisor 320 working in cooperation with the disaggregated architecture 300 of the distributed unit (DU) in the vRAN deployment, according to an exemplary implementation. FIG. 3B is described in conjunction with FIG. 3A. With reference to FIG. 3B, there is shown a hardware resource description (HRD) 318 and a RAN hypervisor 320 that may be configured to work in cooperation with the disaggregated architecture 300 (e.g., as shown in FIG. 3A). The hardware resource description (HRD) 318 may include information related to bus path addresses that may be assigned to peripheral devices and the computing resources that enable communication between the aforementioned components. The HRD 318 may typically include I/O port addresses, interrupt vectors, and blocks of bus-relative memory addresses. In an implementation, the RAN hypervisor 320 may include a RAN compute hypervisor 322 and a RAN monitor 324. The RAN compute hypervisor 322 may cooperatively work with the L2 controller 310 to optimize allocation of computing resources, e.g., RAN hardware 328 (e.g., computing resources 308A, 308B, 308C as shown in FIG. 3A). The RAN compute hypervisor 322 in cooperation with the L2 controller 310 may execute operations related to, for example, load balancing, monitoring, mapping, or scheduling, routing, virtualizing, and optimizing the allocation of the computing resources (e.g., 308A, 308B, 308C as shown in FIG. 3A) deployed in the disaggregated architecture of FIG. 3A. In an implementation, a RAN orchestrator 326 may instantiate and co-ordinate between multiple computing resources or virtual machine instances spawned on the RAN hypervisor 320 based on scheduling information and run-time specifications associated with each instance.

In an implementation, the load balancing operations executed by the RAN compute hypervisor 322 may facilitate tracking multiple processing elements (PE) of the computing resources and allocate the processing elements to the virtual instances of the computing resources, for example, virtual machines of the computing resources (e.g., 308A, 308B, 308C as shown in FIG. 3A). The load balancing operations may include operations, such as managing data buffers, validating an availability of the data buffers, memory mapping, scheduling data transfers to avoid data overflow or underflow. The load balancing operation may further include tracking and managing load on each RAN instance. For example, based on a statistical multiplexing, the load balancing operation may include performing computations and reallocating or resizing the allocated instances of the virtual machines. In an implementation, the RAN compute hypervisor 322 may be configured to execute the operation of a RAN monitoring that enables tracking the scheduled radio bearers (RBs) and the dynamic load associated with the RAN instances.

In an implementation, the mapping and scheduling operations executed by the RAN compute hypervisor 322 may include scheduling the allocation of instances of the computing resources, e.g., RAN hardware 328 (e.g., 308A, 308B, 308C as shown in FIG. 3A). The mapper and scheduler operations may analyse information related to compute, storage, and interconnected computing resources. The aforementioned information may be provided in the hardware resource description (HRD) 318. The mapper and scheduler function may correlate HRD 318 with constraints that are provided by a runtime specification for each instance and generate a mapping of the RAN instance that may include information on an optimized allocation of the computing resources. The operations of the mapper may include tracking the network load based on the statistics that may provision optimally scaling up or scale down the allocation of the computing resources. The operation of the monitoring (e.g., executed by RAN monitoring 324) may include collecting information and statistics related to each RAN instance. The RAN hypervisor 320 may use above information provided by the RAN monitoring 324 and execute operations to scale up the mapping and scheduling process. The RAN hypervisor 320 may also use the security features provided by the hardware and the policies in the RAN orchestrator 326 to limit access or optimize the allocation of the underlying computing resources.

In an implementation, the RAN hypervisor 320 may automate execution of some of the functions of the vRAN. For instance, the RAN hypervisor 320 may execute operations, such as, providing real-time monitoring of all schedulable resources, monitoring the network statistics, storing data for offline inferencing. The network statistics of the RAN operations may include at least one of the constellations, channel impulse response, interference, bit error rate (BER), received signal strength indicator (RSSI) or other radio frequency channel quality indicators. In an implementation, virtualizing attributes specific to the RF resource may provision or facilitate the computing resources to concatenate multiple RF channels and split channels. The RAN hypervisor 320 uses the information to allocate physical RAN hardware (e.g., 328) and RF hardware 330 resources and may also implement attribute specific corrections like pre-coding.

Figure 4:
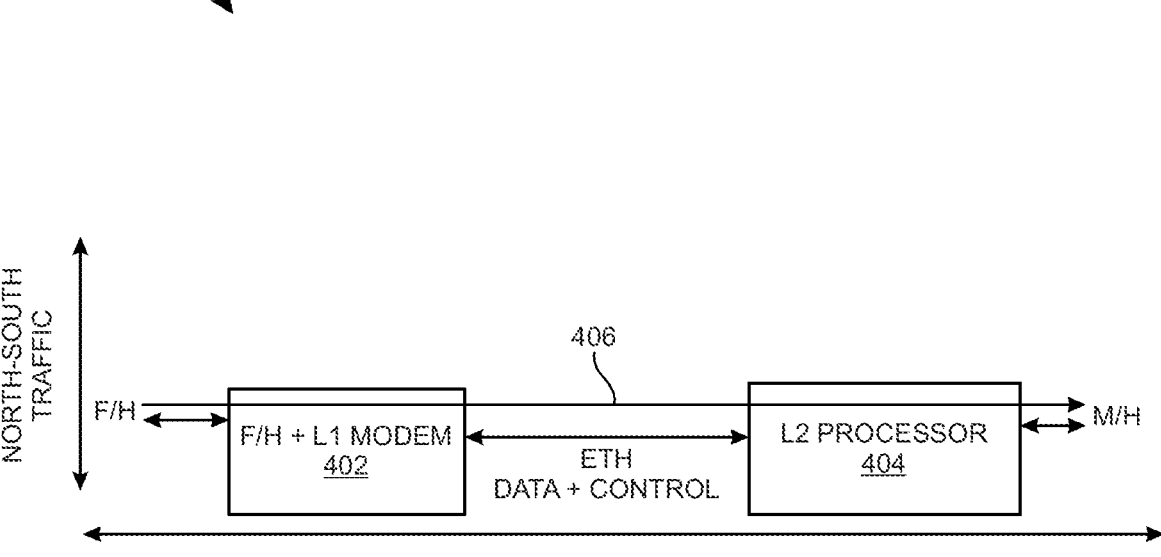
FIG. 4 is a data flow diagram showing a flow of data in the disaggregated architecture 300 of the distributed unit (DU) in the vRAN deployment, according to an exemplary implementation.

FIG. 4 is a data flow diagram 400 showing a flow of data in the disaggregated architecture 300 of the distributed unit (DU) in the vRAN deployment, according to an exemplary implementation. FIG. 4 is described in conjunction with FIG. 3A. With reference to FIG. 4, there is shown a data flow diagram from a mobile front-haul (F/H) to a mid-haul (M/H) in an implementation of the architecture 300 in the vRAN deployment. The data flow diagram 400 shows north-south traffic and east-west traffic. North-south traffic corresponds to the data transfer from the data center and a location outside the network. North-south traffic is typically depicted vertically to illustrate data transfer or traffic that flows in and out of the data center. East-west traffic corresponds to the data transfer or traffic from one server to another server within the data center. The term east-west is typically depicted horizontally to illustrate data transfer or traffic that flows between the data centers and may be related to a local area network (LAN) traffic.

Referring to FIG. 4, the data flow diagram 400 illustrates that data is processed by the computing resources (e.g., 402 and 404) along the signal chain. When data from the F/H moves to M/H (shown as east-west traffic in FIG. 4), it may be processed sequentially by the computing resources (e.g., 402 and 404). Referring to FIG. 4, there is shown that the data processing is restricted to east-west traffic only. The disaggregated architecture 300 of FIG. 3A enables the execution of the operations of the L1 and L2 by dynamically allocating the computing resources, thereby eliminating the need of the deployment of PCI-e interfaces for transferring data between different computing resources. Further, since data is processing is restricted along the east-west traffic, the computing resources are not idle or underutilized, thereby reducing the power consumed by the computing resources.

FIG. 5 is a block diagram showing a deployment of an array of computing resources in the disaggregated architecture 300 of the distributed unit (DU), according to an implementation. FIG. 5 is described in conjunction with FIG. 3A. With reference to FIG. 5, there is shown a deployment of an array of computing resources via the disaggregated architecture 300 in the distributed unit. The array of computing resources may include, for example, network accelerators that may be configured to execute the operations of L1 and L2. For example, the array of network accelerators may be configured to execute operations related to front/haul (F/H) data and Layer 1 (L1) acceleration, represented by F/H+L1 Accel. The deployment of computing resources, for example, 502A, 502B, 502C and 502D; 504A, 504B, 504C and 504D; 506A, 506B, 506C and 506D; 508A, 508B, 508C and 508D may disaggregate the execution of operations related to L1 and L2 in the distributed unit. In an implementation, the array of computing resources, may also be referred to as an array or pool of network accelerators or network accelerator cards may be deployed on a single server or on multiple servers.

In an implementation, the L2 controller 310 may be configured to periodically or dynamically pool the network accelerator cards based on real-time conditions. For example, when the L2 controller 310 detects an occurrence of an event, as described with reference to FIG. 3A, the L2 controller 310 may be configured to execute the operations that may optimize the allocation of the network accelerators. The network accelerator cards, shown in FIG. 5 may be connected via the standard ethernet interface. In an implementation, the pool of network accelerators may be configured to work in cooperation with the L2 server. For example, the computing resources 502A, 502B, 502C and 502D may be configured to work with 510, 504A, 504B, 504C and 504D may be configured to work with 512, and 506A, 506B, 506C and 506D may be configured to work with 514. 508A, 508B, 508C and 508D may be provided as stand by or backup on an event of a failure of one or more computing resources in the array.

FIG. 6 is a block diagram showing an implementation of an automatic reconfiguration of the computing resources by the L2 controller, when a failure of a server is detected, according to an exemplary implementation. FIG. 6 is described in conjunction with FIG. 3A. With reference to FIG. 6, there is shown an array of computing resources that may be deployed to provision the disaggregation of the execution of the operations of L1 and L2. In an implementation, when a computing resource in a server configured to execute operations of L2 fails (e.g., 614 shown by 'X'), the L2 controller (e.g., 310) may be configured to dynamically allocate and reconfigure the computing resources, for example, 606A, 606B, 606C and 606D, to execute the operations of the failed L2 server (e.g., 614) and automatically reconfigure to cooperatively work with 610 and 612. In an implementation, the operational efficacy with reference to the execution of the L2 controller 310 is as described with reference to FIG. 3A.

FIG. 7 is a block diagram showing an implementation of an automatic allocation of a computing resource by the L2 controller 310, when a failure of another computing resource is detected, according to an exemplary implementation. With reference to FIG. 7, there is shown an array of computing resources that may be deployed to provision the disaggregation of the execution of the operations of L1 and L2. In an implementation, when a computing resource, for example, one of the network accelerator card fails (e.g., 706A shown by 'X'), the operations executed by the network accelerator card 706A may be dynamically allocated and reconfigured so that any other network accelerator card based on the availability from the array or pool of network accelerator cards (e.g., 702A, 702B, 702C, 702D 704A, 704B, 704C, 704D, 706B, 706C, 706D) can take over the processing from the card 706A. For example, operations executed by the network accelerator card 706 A may be reassigned and dynamically allocated to 702A, as shown in FIG. 7. In an implementation, the operational efficacy with reference to the execution of the L2 controller 310 is as described with reference to FIG. 3A.

FIG. 8 is a flow diagram showing a process 800 for optimizing an allocation of computing resources, according to an exemplary implementation. FIG. 8 is described in conjunction with FIG. 3A. At functional block 802, a plurality of computing resources at a distributed unit are pooled (this is done, for example, by L2 Controller 310). At functional block 804, at least one event from a plurality of events in the distributed unit is detected. At functional block 806, based on the detected at least one event, at least one computing resource from the plurality of computing resources affected in the distributed unit is determined. At functional block 808, based on the determination, an allocation of at least one computing resource from the plurality of computing resources in the distributed unit is optimized (this is done, for example, by L2 Controller 310). The process at functional block 808 may include dynamically detecting and reconfiguring one of the multiple computing resources so as to reallocate to another computing resource of the multiple computing resources an operation which previously was executed by one of the multiple computing resources. The operational efficacies of the execution and implementation of the process 800 namely functional blocks 802, 804, 806 and 808 are as described with reference to FIG. 3A.

Figure 9:
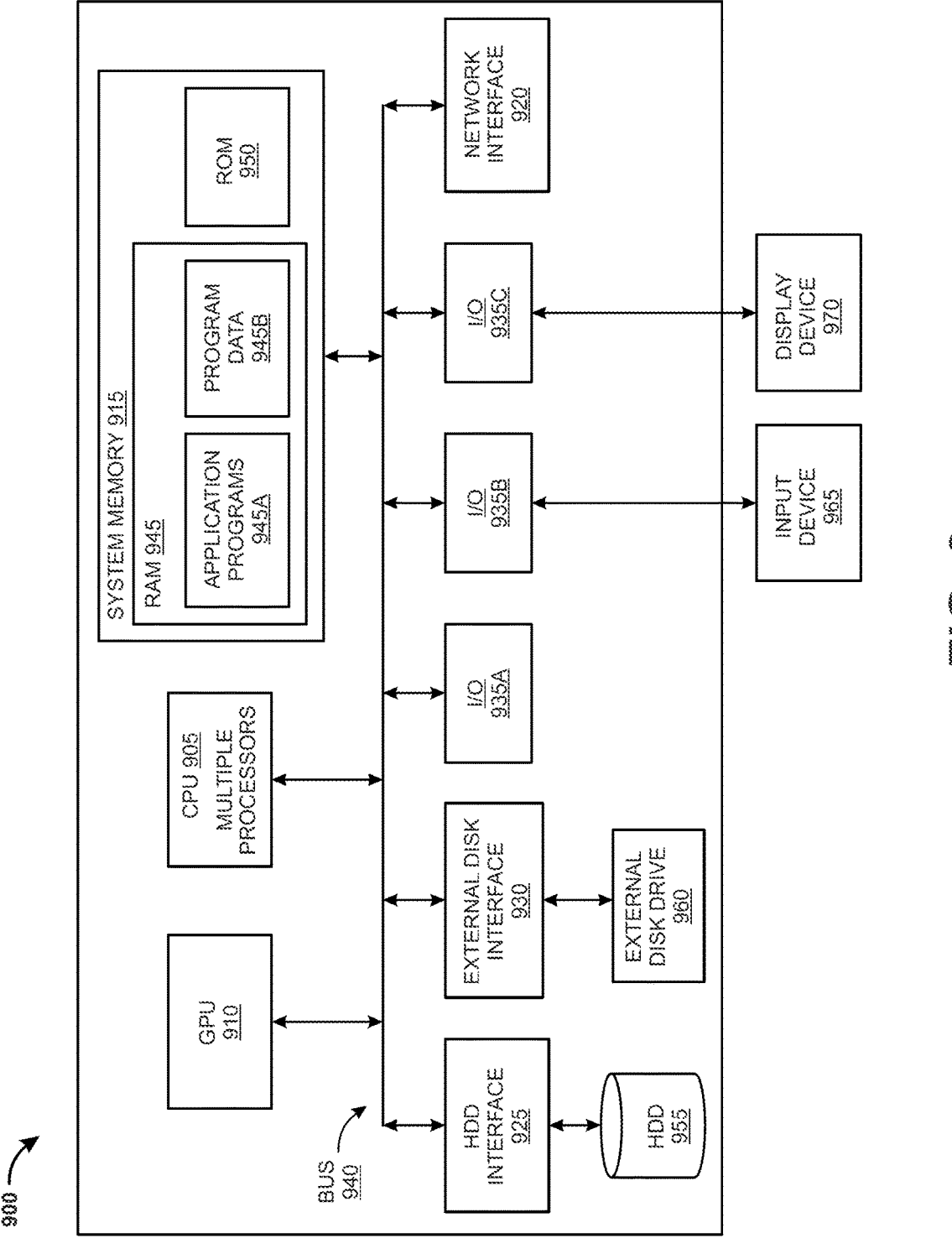
FIG. 9 shows an exemplary hardware configuration of a computer system that may be used to implement functions and operations of the disaggregated architecture of the distributed unit (DU), according to an implementation.

FIG. 9 shows an exemplary hardware configuration of a computer 900 system that may be used to implement functions and operations of the disaggregated architecture 300 of the distributed unit (DU), according to an implementation. The computer 900 shown in FIG. 9 includes CPU 905, GPU 910, system memory 915, network interface 920, hard disk drive (HDD) interface 925, external disk drive interface 930 and input/output (PO) interfaces 935A, 935B, 935C. These elements of the computer are coupled to each other via system bus 940. The CPU 905 may perform arithmetic, logic and/or control operations by accessing system memory 915. The CPU 905 may implement the processors of the exemplary devices and/or system described above. The GPU 910 may perform operations for processing graphic or AI tasks. In case computer 900 is used for implementing exemplary central processing device, GPU 910 may be GPU 910 of the exemplary central processing device as described above. The computer 900 does not necessarily include GPU 910, for example, in case computer 900 is used for implementing a device other than central processing device. The system memory 915 may store information and/or instructions for use in combination with the CPU 905. The system memory 915 may include volatile and non-volatile memory, such as random-access memory (RAM) 945 and read only memory (ROM) 950. A basic input/output system (BIOS) containing the basic routines that helps to transfer information between elements within the computer 900, such as during start-up, may be stored in ROM 950. The system bus 940 may be any of several types of bus structures including a memory bus or memory controller, a peripheral bus, and a local bus using any of a variety of bus architectures.

The computer may include network interface 920 for communicating with other computers and/or devices via a network. Further, the computer may include hard disk drive (HDD) 955 for reading from and writing to a hard disk (not shown), and external disk drive 960 for reading from or writing to a removable disk (not shown). The removable disk may be a magnetic disk for a magnetic disk drive or an optical disk such as a CD ROM for an optical disk drive. The HDD 955 and external disk drive 960 are connected to the system bus 940 by HDD interface 925 and external disk drive interface 930, respectively. The drives and their associated non-transitory computer-readable media provide non-volatile storage of computer-readable instructions, data structures, program modules and other data for the general-purpose computer. The computer-readable instructions may correspond to the mechanism for optimizing allocation of computing resources, dynamically determining network conditions.

Although the exemplary environment described herein employs a hard disk (not shown) and an external disk (not shown), it should be appreciated by those skilled in the art that other types of computer readable media which can store data that is accessible by a computer, such as magnetic cassettes, flash memory cards, digital video disks, random access memories, read only memories, and the like, may also be used in the exemplary operating environment.

A number of program modules may be stored on the hard disk, external disk, ROM 950, or RAM 945, including an operating system (not shown), one or more application programs 945A, other program modules (not shown), and program data 945B. The application programs may include at least a part of the functionality as described above.

The computer 900 may be connected to input device 965 such as mouse and/or keyboard and display device 970 such as liquid crystal display, via corresponding I/O interfaces 935A to 935C and the system bus 940. In addition to an implementation using a computer 900 as shown in FIG. 9, a part or all the functionality of the exemplary implementations described herein may be implemented as one or more hardware circuits. Examples of such hardware circuits may include but are not limited to: Large Scale Integration (LSI), Reduced Instruction Set Circuits (RISC), Application Specific Integrated Circuit (ASIC) and Field Programmable Gate Array (FPGA).

One or more implementations are now described with reference to the drawings, wherein like reference numerals are used to refer to like elements throughout. In the following description, for purposes of explanation, numerous specific details are set forth in order to provide a thorough understanding of the various implementations. It is evident, however, that the various implementations can be practiced without these specific details (and without applying to any particular networked environment or standard).

As used in this application, in some implementations, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

The above descriptions and illustrations of implementations, including what is described in the Abstract, is not intended to be exhaustive or to limit the one or more implementations to the precise forms disclosed. While specific implementations of, and examples for, the one or more implementations are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

While the present disclosure is described with reference to certain implementations, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the particular implementation disclosed, but that the present disclosure will include all implementations that fall within the scope of the appended claims.

What is claimed is:

1. A system to optimize an allocation of a computing resource in a distributed unit, comprising:

a processor; and one or more memory devices communicatively coupled with the processor and storing instructions, for, when executed on the processor, causing the system to execute functions of:

periodically pooling a plurality of computing resources in a distributed unit, wherein each of the plurality of computing resources executes an operation related to the distributed unit;

detecting at least one event from a plurality of events in the distributed unit;

based on the detected at least one event, determining at least one affected computing resource from the plurality of computing resources affected in the distributed unit; and based on the determination, dynamically detecting and reconfiguring at least one of the plurality of computing resources other than the at least one affected computing resource in real time, so as to reallocate, to another computing resource the at least one detected and reconfigured of the plurality of computing resource, an operation which previously was executed by the at least one of the plurality of affected computing resource, to optimize an allocation of the at least one detected and reconfigured computing resource from the plurality of computing resources in the distributed unit, wherein the dynamic detection and reconfiguration of the at least one of the plurality of computing resources is provided by statistical multiplexing of the plurality of computing resources for execution of one or more operations in the distributed unit, wherein the statistical multiplexing of the plurality of computing resources enables hot plugging of one or more computing resources from the plurality of computing resources.

2. The system of claim 1, further comprising: automatically reconfiguring the allocated at least one detected computing resource to execute one or more operations of the affected at least one affected computing resource in the distributed unit.

3. The system of claim 1, wherein the at least one event from the plurality of events corresponds to:

a failure of one or more computing resources from the plurality of computing resources; and/or an on demand increase in volume of data to be processed by one or more computing resources in the distributed unit: and/or a decrease in the volume of the data to be processed by the one or more computing resources in the distributed unit.

4. The system of claim 1, wherein the plurality of computing resources disaggregates execution of one or more operations associated with Layer 1 (L1and Layer 2 (L2) in the distributed unit.

5. The system of claim 4, wherein the execution of one or more operations associated with Layer 1 (L1) and Layer 2 (L2) in the distributed unit are disaggregated without impacting a latency.

6. A method for optimizing an allocation of a computing resource in a distributed unit, comprising:

periodically pooling a plurality of computing resources in a distributed unit;

detecting at least one event from a plurality of events in the distributed unit, wherein each of the plurality of computing resources executes an operation related to the distributed unit;

based on the detected at least one event, determining at least one affected computing resource from the plurality of computing resources affected in the distributed unit; and based on the determination, dynamically detecting and reconfiguring at least one of the plurality of computing resources other than the at least one affected computing resource in real time, so as to reallocate, to another computing resource the at least one detected and reconfigured of the plurality of computing resource, an operation which previously was executed by the at least one of the plurality of affected computing resource for optimizing an allocation of at least one detected and reconfigured computing resource from the plurality of computing resources in the distributed unit, wherein the dynamic detection and reconfiguration of the at least one of the plurality of computing resources is provided by statistical multiplexing of the plurality of computing resources for execution of one or more operations in the distributed unit, wherein the statistical multiplexing of the plurality of computing resources enables hot plugging of one or more computing resources from the plurality of computing resources.

7. The method of claim 6, further comprising: automatically reconfiguring the allocated at least one detected computing resource to execute one or more operations of the affected at least one affected computing resource in the distributed unit.

8. The method of claim 6, wherein the at least one event from the plurality of events is:

a failure of one or more computing resources from the plurality of computing resources; and/or an on demand increase in volume of data to be processed by one or more computing resources in the distributed unit: and/or a decrease in the volume of the data to be processed by the one or more computing resources in the distributed unit.

9. The method of claim 6, wherein the plurality of computing resources disaggregates execution of one or more operations associated with Layer 1 (L1) and Layer 2 (L2) in the distributed unit.

10. The method of claim 9, wherein the execution of one or more operations associated with Layer 1 (L1) and Layer 2 (L2) in the distributed unit are disaggregated without impacting a latency.

11. The method of claim 6, wherein the optimizing of allocation of the at least one computing resource from the plurality of computing resource enables efficient utilization of the allocated at least one computing resource.

* * * * *